United States Patent [19]
Okamoto et al.

[11] 3,747,058
[45] July 17, 1973

[54] ULTRASONIC DETECTION APPARATUS

[75] Inventors: Shinsuke Okamoto, Nishinomiya; Hiromitsu Unoue, Kyoto; Hirosi Ohasi, Neyagawa; Hirokazu Mori, Osaka; Shojiro Kawaguchi, Hikone, all of Japan

[73] Assignee: Matsushita Electric Works, Ltd., Osaka, Japan

[22] Filed: Oct. 8, 1971

[21] Appl. No.: 187,635

[30] Foreign Application Priority Data
Oct. 15, 1970 Japan.................................. 45/90723
May 26, 1971 Japan.................................. 46/43565

[52] U.S. Cl.......... 340/16 R, 340/258 B, 343/5 PD
[51] Int. Cl................................................ G01s 3/80
[58] Field of Search ................ 340/16 R, 250 B; 343/5 PD

[56] References Cited
UNITED STATES PATENTS
3,331,065  7/1967  McDonald...................... 343/5 PD
3,065,455  11/1962  Roth................................. 340/16 R
3,360,775  12/1967  Schroeder............................ 340/32

*Primary Examiner*—Benjamin A. Borchelt
*Assistant Examiner*—G. E. Montone

[57] ABSTRACT

This invention relates to an ultrasonic detection apparatus, in which ultrasonic wave is produced by a constant frequency oscillator provided at the side of transmission, said wave is transmitted through a transmitting transducer and received by a receiving transducer, the output of the receiving transducer is amplified and rectified, and then a part of the thus rectified output is positively fed back to an amplifier of the transmittance side through a variable gain circuit.

4 Claims, 7 Drawing Figures

3,747,058

ULTRASONIC DETECTION APPARATUS

DISCLOSURE OF THE INVENTION

This invention relates to an ultrasonic detection apparatus.

For the ultrasonic detection apparatus, of the kind referred to, there has been suggested such an apparatus of a system that, for example, an output from an oscillator is amplified and the output thus amplified is applied to a transmitting transducer, the ultrasonic output from the transmitting transducer is received by a receiving transducer and then the output from the receiving transducer is amplified to actuate a switch circuit. According to this conventional system, even when a human body or any other obstructive object is interposed between the transmitting transducer and receiving transducer, the incident wave entering the receiving transducer is not greatly reduced due to diffraction effect of the ultrasonic wave. This results in a disadvantage in that required operation of the switch is uncertain. There has been suggested another type of system as in, for example, the U.S. Pat. No. 3,065,455, in which an amplifier and a transmitting transducer are provided on the transmission side while a receiving transducer and an amplifier are provided on the receiving side, and a part of the output from the amplifier on the receiving side is positively fed back to the amplifier on the transmission side. In this system, there is a disadvantage in that no oscillator is provided on the transmission side, the operational frequency of the system is determined by characteristics of the transmitting oscillator, circuitry constant and the like, and thus the frequency is unstable. This may cause a mutual interference to occur when two of the apparatus are arranged adjacent one another, which will result in a generation of beat due to such unstable operational frequencies of the respective two adjacent apparatus and, thus, due to possible difference between the respective frequencies. Therefore, this system has also a drawback of unstable operation. The present invention has been proposed to remove the above mentioned drawbacks and has solved the problem of mutual interference of the ultrasonic detection apparatus by providing a constant frequency oscillator on the transmission side. In the present invention, a variable gain circuit is provided in a positive feed back circuit from the receiving side to the transmission side, so that it is possible to select the cut-off characteristics of ultrasonic waves freely.

A principal object of the present invention is, therefore, to provide an ultrasonic detection apparatus which is stable in operation.

Another object of the invention is to provide an ultrasonic detection apparatus of which cut-off characteristics can be freely selected.

Other objects and advantages of the invention will become clear upon reading the following description set forth in detail with reference to accompanying drawings, in which.

Figure 1:
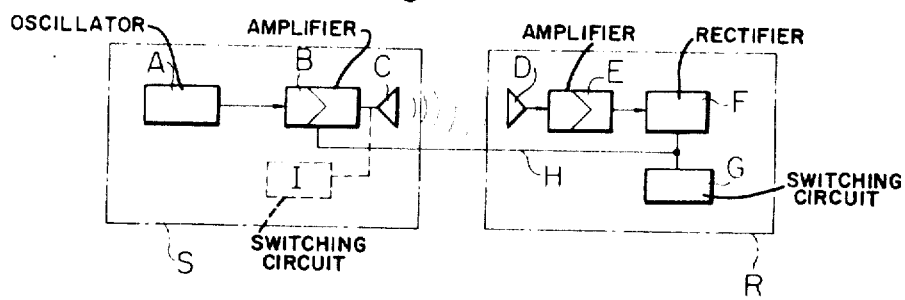
FIG. 1 is a block diagram of an embodiment of the present invention.

Referring now to FIG. 1, which is a block diagram of the present invention, the reference A designates an oscillator, B is a variable gain amplifier, C is a transmitting transducer, D is a receiving transducer, E is an amplifier, F is a rectifying circuit, G is a switching circuit and H is a D.C. positive feed back loop which is fed back to the variable gain amplifier B.

The oscillator A, the variable gain amplifier B and the transmitting transducer C constitute a transmitting unit S, which the receiving transducer D, the amplifier E, the rectifying circuit F and the switching circuit G constitute a receiving unit R.

In the drawing, the reference I shows a switching circuit arranged at the side of the transmitting unit S.

Figure 2:
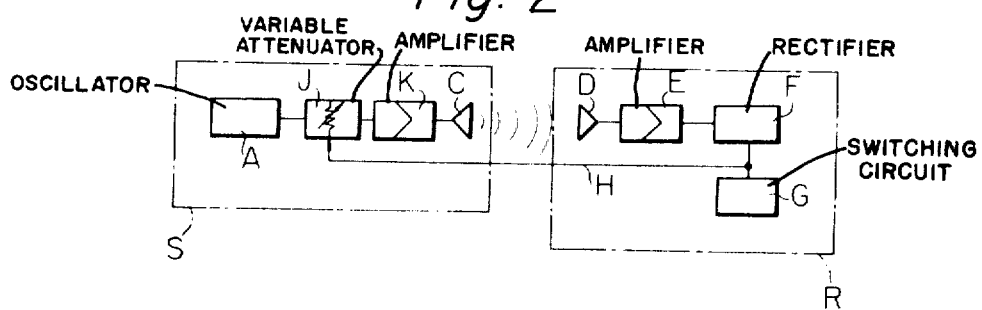
FIG. 2 is a block diagram of another embodiment of the invention.

FIG. 2 shows another embodiment, which is the same as FIG. 1 except that the variable gain amplifier B as shown in FIG. 1 is replaced by a variable attenuator J and an amplifier K both being arranged at the side of transmitting unit.

Figure 5:
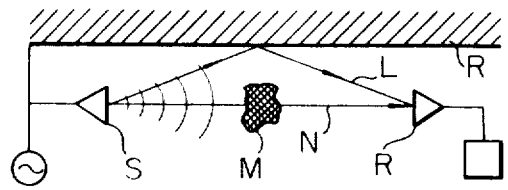
FIG. 5 is an explanatory view showing the state of emission of ultrasonic beam.

In such conventional switching circuit of the kind referred to above, ultrasonic beams are made to travel between the respective transmitting and receiving transducers as shown in FIG. 5 and the ultrasonic wave diffracts on the wall R or the like even when an obstacle M exists in the beam, so that incident wave on the receiving transducer will become much less. This leads to a drawback in that the switching operation is not reliable.

The operation of the apparatus will be explained in the following. Ultrasonic frequency (40 KHz) is derived from the oscillator A and applied to the variable gain amplifier B. The output from the amplifier is then applied to an oscillator element in the transmitting transducer C to emit ultrasonic wave into air. When a receiving oscillator element is arranged so as to oppose to said oscillator element in the transducer C, a voltage is induced by the ultrasonic wave in air. Such minute signal is amplified and rectified to produce a D.C. voltage corresponding to the input signal. The loop is so arranged that the amplification of the variable gain amplifier B is adjusted by this D.C. voltage, thereby the emitted ultrasonic wave will be stronger with increase to the input (FIGS. 1 and 2).

In this case, a combination of the variable attenuator and the amplifier may be used in place of the variable gain amplifier (FIG. 2).

Figures 3A, 3B:
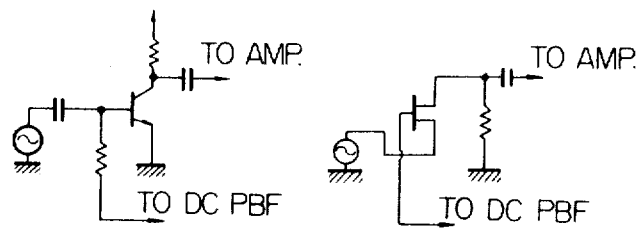
FIG. 3A shows a circuit diagram of a variable gain amplifier and FIG. 3B shows a circuit diagram of a variable attenuator.

FIGS. 3A and 3B show circuit diagrams of the variable gain amplifier and the variable attenuator, respectively.

If an obstacle M is interposed between the transmitting transducer and the receiving transducer as shown in FIG. 5, the ultrasonic wave going straight is cut off. However, possible change of the incident ultrasonic wave is small because of an input due to reflected wave L from the wall. As a result, if the apparatus is used as a switch, the switching operation becomes uncertain. If the apparatus is so arranged that positive feed back is provided from the receiving side to the transmitting side as shown in FIGS. 1 and 2, the output is decreased with reduction in the input due to the obstacle body M and thus the extent of the output variation becomes greater, so that the switching operation becomes positively certain.

Figure 4:
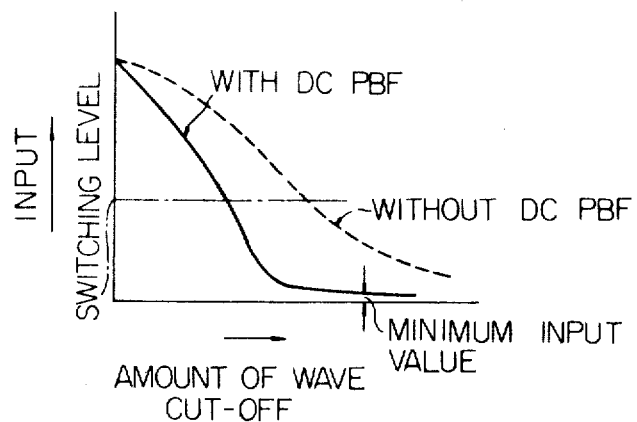
FIG. 4 shows diagrammatically the relation between the amount of wave cut-off and an input.

The above relationship is shown in FIG. 4, in which the curve "WITHOUT DC PBF" in dotted line represents the attenuation due to the obstacle M only and without the ultrasonic D.C. feed back, and the curve "WITH DC PBF" in solid line represents the attenuation with D.C. feed back, the latter curve showing that the variation is greater. It should be noted that the minimum value of input should be set in such that it will turn to the signal level required to return to its original state in the absence of the obstacle M.

As seen from the above, the present invention relates to a switch for cutting off ultrasonic beam for use in a switch device which is actuated when the ultrasonic beam emitted into air is cut off, in which positive feed back is provided in such a manner that emitted waves become larger with increase of incident waves. The switching operation thereof is, therefore, very stable and, thus, it is enabled that the operation is still performed even when the switch is installed in the vicinity of the wall or the like. It is also possible that the oscillating frequency can be freely selected in the oscillating circuit.

Figure 6:
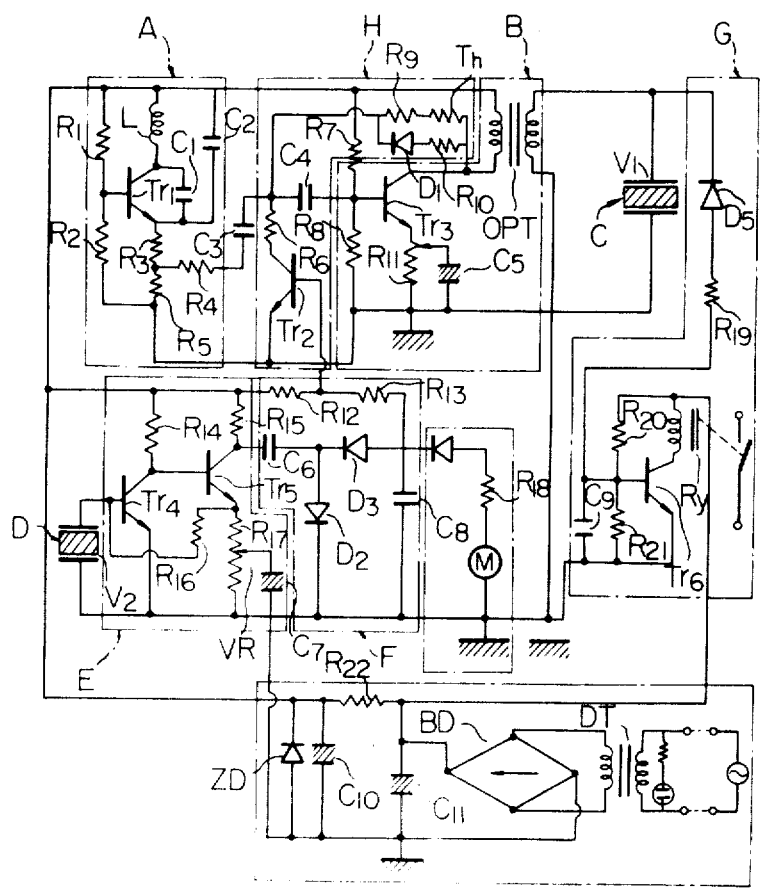
FIG. 6 is a circuit of practical embodiment of the present invention.

FIG. 6 shows an example of a practical circuit embodying the present invention.

A transistor $Tr_1$ is used for oscillation of ultrasonic frequency, and a Colpitts circuit is used as the circuit system. In the circuit, $R_1$ and $R_2$ are biasing resistors for the transistor $Tr_1$, and L, $C_1$ and $C_2$ are an inductance and capacitors, respectively, which determine oscillating frequency. $R_3$ and $R_5$ are emitter resistors and a singal is derived as voltage-divided through the resistors $R_3$ and $R_5$.

This signal is applied to the base of an output transistor $Tr_3$ through a resistor $R_4$ and capacitors $C_3$ and $C_4$.

The resistor $R_4$ is a buffer resistance for preventing the oscillating frequency of the like from being varied due to any variation in constants of the next stage.

Resistors $R_7$ and $R_8$ are for biasing the transistor $Tr_3$, and $R_{11}$ is an emitter resistance for self biasing. $C_5$ is a by-pass capacitor. The signal applied to the transistor $Tr_3$ is amplified and applied to an oscillator $V_1$ through an output transformer OPT to emit the ultrasonic waves.

$R_9$, Th, $R_{10}$ and $D_1$ are a feed back resistor, a thermistor and a diode, respectively. Among these elements, the resistor $R_9$ and the thermistor Th perform temperature compensation of the output amplifying circuit. The resistor $R_{10}$ and the diode $D_1$ are to vary the output amplifier gain so as to control the current value fed to the diode, thereby the amount of feed back is varied and, thus, the gain is adjusted.

Transistors $Tr_4$ and $Tr_5$ are to amplify such small signal received by the receiving transducer $V_2$ and the ultrasonic wave signal emitted into air. $R_{14}$ is biasing resistor of the transistor $Tr_5$ as well as being a load resistor of the transistor $Tr_4$, and $R_{16}$ is a biasing resistor of the transistor $Tr_4$ and provides a D.C. feed back. $R_{17}$ and VR are emitter resistors for the transistor $Tr_5$ and the variable resistor VR varys current flowing through a by-pass capacitor $C_7$, so that alternative current amount of the feed back will be controlled and, thereby the amplification degree is controlled.

The resistor $R_{17}$ is effective in preventing oscillation by leaving perceivable feed back, since direct connection of the capacitor $C_7$ to the emitter of transistor $Tr_5$ causes the amplification degree to raise excessively and, thereby, the oscillation is caused to occur. The resistor VR is so adjusted that the gain may become greater in case of a great distance between the transmitting and the receiving transducer while the gain may become smaller in case such distance is small. $R_{15}$ is a load resistor of the transistor $Tr_5$. The alternating current signal output is derived by the capacitor $C_6$, and half-wave double voltage rectification is effected by the diodes $D_2$ and $D_3$ and then a smoothing is effected by the capacitor $C_8$. The quantity of input signal is indicated by a meter M' through the diode D and the resistor $R_{18}$ by use of this minus output voltage. The diode $D_4$ is to prevent the meter from swinging in reverse direction due to the plus voltage applied through the resistors $R_{12}$ and $R_{13}$.

Transistor $Tr_6$ is a switching transistor, to the base of which the oscillating output derived from the secondary side of the output transformer OPT is applied after rectified by the diode $D_5$. As the relay of this switching circuit is required to operate when the oscillating output is decreased, the rectified minus voltage is applied to the base of the transistor $Tr_6$ through a resistor $R_{19}$ after the transistor $Tr_6$ is turned ON by causing a current to flow through a resistor $R_{20}$ to the base of the transistor, and respective values of the transistors $R_{19}$, $R_{20}$ and $R_{21}$ are set so that the transistor $Tr_6$ turns OFF in case of the presence of oscillating output. In FIG. 6, ZD is a constant voltage diode, PT is a power transformer, BD is a rectifying circuit, and $R_{22}$, $C_{10}$ and $C_{11}$ constitute a filtering circuit.

Across the capacitor $C_8$, there appears a minus D. C.. voltage corresponding to the ultrasonic wave input, by which the transistor $Tr_2$ forming a variable gain circuit is controlled. As the transistor $Tr_2$ is required to turn OFF when the input to the receiving transducer $V_2$ is large, the minus voltage of the capacitor $C_8$ is applied to the base of the transistor $Tr_2$ through a resistor $R_{13}$. On the other hand, when no input or very small input is applied to the receiving transducer $V_2$, the voltage across the capacitor $C_8$ becomes zero. However, as the transistor $Tr_2$ is required to be in the ON state, the plus voltage is applied from the power source to the transistor through the resistor $R_{12}$. Accordingly, in case any input is applied to the receiving transducer, it is necessary to set the value of the resistor $R_{13}$.

When a D.C. current corresponding to the input to the receiving transducer $V_2$ flows to the base of the transistor $Tr_2$, the transistor $Tr_2$ turns ON and the current flows through the resistor $R_{10}$, the diode $D_1$ and the resistor $R_6$ to the transistor $Tr_2$. If the input to the base of the transistor $Tr_2$ is increased, the input signal to the transistor $Tr_3$ is grounded through the resistor $R_6$, thereby the input is increased and the internal resistance of the diode is also decreased. As a result, the feed back is increased and the gain of the transistor $Tr_3$ is decreased. Namely, if the input to the transistor $Tr_2$ is increased, the ultrasonic wave output is decreased.

Maximum output from the output amplifier is determined by the amount of feed back of the resistor $R_9$ and the thermistor Th, while minimum output is determined by the resistors $R_6$ and $R_{10}$. If the respective values of resistors $R_9$ and $R_{10}$ are set to be small or zero, the output of the output circuit becomes zero in case the input to the transistor $Tr_2$ becomes large, and the operation of the whole circuit remains stopped. For this reason, the value of the respective resistors $R_2$ and $R_6$ are so determined that a small output will still remain even when the input to the transistor $Tr_2$ is increased and the transistor is turned ON completely.

What is claimed is:

1. An ultrasonic detection apparatus comprising the combination of an oscillator for producing an oscillatory signal, a transmitting transducer to which said oscillatory signal is applied for generating an ultrasonic wave beam, a variable gain device connected between said oscillator and said transmitting transducer for controlling the amplitude of the oscillatory signal applied to said transmitting transducer, a receiving transducer for receiving the ultrasonic wave beam from said transmitting transducer and producing an output signal which varies in accordance with variations in the magnitude of the received ultrasonic wave beam, a second amplifier for amplifying the output signal from said receiving transducer, a rectifier circuit for rectifying the output from said second amplifier, a switching circuit actuated by the output from said rectifier circuit, and feedback means connected from the output of said rectifier circuit to said variable gain device and responsive to changes in the magnitude of the output from said rectifier circuit for effecting corresponding changes in the magnitude of the input to said transmitting transducer while maintaining a constant output signal from said oscillator whereby the oscillatory signal applied to said transmitting transducer is maintained at a stable frequency of oscillation.

2. An ultrasonic detection apparatus as set forth in claim 1, in which an output terminal of said first amplifier at the transmitting side is grounded through a series circuit of a diode and a resistor and through the collector and emitter of a controlling transistor, and a D.C. feed back signal from the receiving side is applied to the base of said controlling transistor, so that the controlling transistor will be turned ON and OFF in response to the input to the receiving transducer, whereby the gain of the first amplifier at the transmitting side is varied.

3. An ultrasonic detection apparatus as set forth in claim 2, in which the base of said transistor constituting said first amplifier at the transmitting side is connected to the junction point of said series circuit of the diode and the resistor with said controlling transistor through a capacitor.

4. An ultrasonic detection apparatus as set forth in claim 3, in which a resistor is inserted between said controlling transistor and said capacitor, so that the output from said first amplifier at the transmitting side will be prevented from becoming zero to cause the whole circuit to be turned into inoperative condition.

* * * * *